(12) United States Patent
Basu et al.

(10) Patent No.: US 7,171,490 B2
(45) Date of Patent: Jan. 30, 2007

(54) METHOD AND APPARATUS FOR REDUCING THE NUMBER OF WRITE OPERATIONS DURING ROUTE UPDATES IN PIPELINED FORWARDING ENGINES

(75) Inventors: Anindya Basu, Jersey City, NJ (US); Girija J. Narlikar, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 860 days.

(21) Appl. No.: 10/246,204

(22) Filed: Sep. 18, 2002

(65) Prior Publication Data
US 2004/0054806 A1    Mar. 18, 2004

(51) Int. Cl.
*G06F 15/173* (2006.01)
(52) U.S. Cl. .................... 709/242; 709/238; 711/161; 711/162; 707/202; 707/204; 370/352
(58) Field of Classification Search ............... 709/242; 707/204, 202; 711/161, 162; 370/352
See application file for complete search history.

(56) References Cited

U.S. PATENT DOCUMENTS

| 6,643,671 B2 * | 11/2003 | Milillo et al. ............ 707/204 |
| 2003/0026246 A1 * | 2/2003 | Huang et al. ............ 370/352 |

OTHER PUBLICATIONS

Cheng, G. et al., *Optimal Routing Table Design of IP Address Lookups Under memory Constraints*. In Proceedings of Infocom '99, pp. 1437-1444, New York, NY, Mar. 1999.

Degemark, M. et al., *Small Forwarding Tables for Fast Routing Lookups*. In Proceedings of SIGCOMM '97, p. 3-14, Cannes, France, Sep. 1997.

Draves, R. P. et al., *Constructing Optimal IP Routing Tables*. In Proceedings of Infocom '99, New York, NY, Mar. 1999.

Gupta, P. et al., *Routing Lookups in Hardware at Memory Access Speeds*. In Proceedings of Infocom '98, p. 1240-1247, San Francisco, CA, Apr. 1998.

Gupta, P. et al., *Near-Optimal Routing Lookups with Bounded Worst Case Performance*. In Proceedings of Infocom '00, p. 1184-1192, Tel Aviv, Israel, Mar. 2000.

Lampson B., et al., *IP Lookups Using Multiway and Multicolumn Search*. In Proceedings of Infocom '98, p. 1248-1256, San Francisco, CA, Apr. 1998.

(Continued)

*Primary Examiner*—Yves Dalencourt
(74) *Attorney, Agent, or Firm*—Kenneth M. Brown

(57) ABSTRACT

A method and apparatus for reducing the number of write operations during route updates in router forwarding engines eliminates "excess" (i.e., "redundant") writes to the routing trie. One or more writes are "redundant" with respect to another write if the timestamp of the other write is the same as or later than (by an amount less than a given threshold) the timestamp of each of the one or more writes, and if the state of the routing trie after the other write has been applied is equivalent whether or not any of the one or more writes have also been applied. Excess writes may be advantageously eliminated when routes are either added to or withdrawn from the routing trie, and deleted subtrees may be advantageously cached for subsequent re-addition thereto.

20 Claims, 6 Drawing Sheets

OTHER PUBLICATIONS

Nilsson, S. et al., *IP-address Lookup Using LC-tries*. IEEE Journal on Selected Areas in Communications, p. 1083-1092, Jun. 1999.

Sikka, S. et al., *Memory-Efficient State Lookups with Fast Updates*. In Proceedings of SIGCOMM '00, p. 335-347, Stockholm, Sweden, Aug. 2000.

Srinivasan, V. et al., *Fast Address Lookups Using Controlled Prefix Expansion*. ACM Transactions on Computer Systems, p. 1-40, Feb. 1999.

Waldvogel, G. et al., *Scalable High Speed IP Routing Lookups*. In Proceedings of SIGCOMM '97, p. 25-38, Cannes, France, Sep. 1997.

* cited by examiner

```
                val  level  index
withdraw A:  | write   0    p    62   |
withdraw B:  | write   0    p    63   |         WRITE
withdraw C:  | write   0    p    64   |      ───────────→   | write   0   p-1  61 * |
                                              ELIMINATION
withdraw D:  | write   0   p-1  61 * |
```

FIG. 11

|  | val | level | index |
|---|---|---|---|
| add B: write | A | 4 | 42 |
| write | N5 | 4 | 43 |
| write | A | 5 | 54 |
| write | N6 | 5 | 55 |
| write | A | 6 | 66 |
| write | B | 6 | 67 |
| write | N4 | 3 | 31 * | without caching

|  | val | level | index |
|---|---|---|---|
| add B: write | N4 | 3 | 31 * | with caching

METHOD AND APPARATUS FOR REDUCING THE NUMBER OF WRITE OPERATIONS DURING ROUTE UPDATES IN PIPELINED FORWARDING ENGINES

FIELD OF THE INVENTION

The present invention relates generally to the field of packet-based data networks and more particularly to a method and apparatus for improving the performance of IP (Internet Protocol) router forwarding engines employing pipelined ASIC (Application Specific Integrated Circuit) architectures which use incremental route updates.

BACKGROUND OF THE INVENTION

Recent advances in optical networking technology have pushed line card data transfer rates in high speed IP routers to 40 Gbits/s (gigabits per second), and even higher data rates are expected in the near term. Given such high data rates, packet forwarding in high speed IP routers must necessarily be done in hardware. Current hardware-based solutions for high speed packet forwarding fall into two main categories, namely, ASIC-based solutions and ternary CAM (Content-Addressable Memory) or TCAM-based solutions. (Network processor-based solutions are also being considered for high speed packet forwarding, although network processors that can handle 40 Gbits/s wire speeds are not yet generally available.) ASIC-based architectures typically implement a data structure known as a "routing trie" using some sort of high speed memory such as SRAMs. As is well known to those skilled in the art, a routing trie is a tree-based data structure used to store routing prefixes for use in longest prefix matching. (As is also well known to those of ordinary skill in the art, longest prefix matching is used to determine to which neighboring network node a packet with a given destination should be forwarded.) If a single SRAM memory block is used to store the entire routing trie, multiple accesses (one per routing trie level) are required to forward a single packet. This can slow down lookups considerably, and the forwarding engine may not be able to process incoming packets at the line rate. Recently, however, it has been proposed that forwarding speeds can be significantly increased if pipelining is used in ASICA-based forwarding engines. This is because with multiple stages in the pipeline (e.g., one stage per trie level), one packet can be forwarded during every memory access time period.

In addition, pipelined ASICs that implement routing tries provide a general and flexible architecture for a wide variety of forwarding and classification tasks. This is a major advantage in today's high end routers which have to provide packet flow classification and filtering, as well as multicast and IPv6 routing in addition to the standard IPv4 routing functions. (IPv4 and IPv6 represent Internet Protocol versions 4 and 6, respectively, and are each fully familiar to those of ordinary skill in the art.) Since longest prefix matching is the technique common to all of these tasks, the same pipelined hardware can be used to perform them all efficiently, thereby producing significant savings in cost, complexity and space.

Despite the advantages of pipelined ASIC architectures, managing routing tries during route updates in such architectures is difficult. Although one way to simplify management would be to use double buffering—that is, to create a duplicate copy of the lookup trie and use one for lookups and the other for updates—the memory required would obviously be doubled, thereby doubling the relatively expensive SRAM cost. Therefore, a pipelined ASIC-based architecture which employs a single routing trie amenable to efficient incremental updates is preferable.

In co-pending U.S. patent application Ser. No. 10/175, 461, "Method And Apparatus For Generating Efficient Data Structures For Use In Pipelined Forwarding Engines," filed by A. Basu et al. on Jun. 19, 2002 and commonly assigned to the assignee of the present invention, it was recognized that to provide for a pipelined ASIC-based forwarding engine architecture which is amenable to efficient incremental updates, it would be advantageous to design and generate the associated routing trie such that the memory allocated to the trie is evenly balanced across the multiple pipeline stages. In this manner, incremental updates to the trie are more likely to require memory modifications which are evenly distributed across the memory of the different pipeline stages, thereby taking advantage of the parallel processing capabilities inherent in such a pipelined architecture. U.S. patent application Ser. No. 10/175,461 is hereby incorporated by reference as if fully set forth herein.

Nonetheless, despite the use of efficient routing trie data structures such as those which may, for example, be generated in accordance with the disclosure of U.S. patent application Ser. No. 10/175,461, route updates occur quite frequently and can, in general, still be quite disruptive to the process of fast path lookup performed by a pipelined forwarding engine. Therefore, even given such a well-designed routing trie, it would further be highly advantageous to reduce such disruption by providing for more efficient incremental route updates.

SUMMARY OF THE INVENTION

We have recognized that when incremental route updates are performed in a forwarding engine, updates to neighboring routes in the routing trie often occur nearly simultaneously. In particular, routes in an entire subtree often get added or withdrawn at approximately the same time (e.g., in the same second). This may, for example, occur when a change in the condition of a link or router affects a whole set of downstream routes. Moreover, we have further recognized that when routes are withdrawn, new routes having the same destination prefix are often added back a few seconds later. This may, for example, occur when the best route to a destination prefix is withdrawn, and when a new route having the same destination prefix is then added to the forwarding table after it is computed (e.g., by the central processor), using, for example, conventional BGP (Border Gateway Protocol) rules.

Based on the above and in accordance with an illustrative embodiment of the present invention, a method and apparatus for reducing the number of write operations (i.e., "writes") during route updates in router forwarding engines is provided by advantageously eliminating "excess" (i.e., "redundant") writes to the routing trie. In particular, we define one or more writes as being "redundant" with respect to another write if the timestamp associated with the other write (i.e., the time that the other write is to be applied) is the same as or later than (by an amount less than a given threshold) the timestamp associated with each of the one or more writes (i.e., the time that each of the one or more writes is to be applied), and if the state of the routing trie after the other write has been applied is equivalent whether or not any of the one or more writes have also been applied.

In accordance with one illustrative embodiment of the present invention, excess writes may be eliminated when one or more routes are added to the routing trie. In accordance with another illustrative embodiment of the present invention, excess writes may be eliminated when one or more routes are withdrawn from the routing trie. Moreover, in accordance with one illustrative embodiment of the present invention, subtrees which are deleted from the routing trie as a result, for example, of a withdrawal of one or more routes, are advantageously cached for subsequent re-addition to the trie when one or more of the withdrawn routes are added back thereto.

BRIEF DESCRIPTION OF THE DRAWINGS

FIG. 11 shows the elimination of writes which advantageously results from the illustrative caching operation as applied in FIG. 10 when a deleted route is reinserted.

DETAILED DESCRIPTION

Trie-Based IP Lookups in Forwarding Engines

As is well known to those skilled in the art, a trie is essentially a tree that is used to store routing prefixes for longest prefix matching. Each trie node contains two fields—an IP prefix represented by the node (null if none) and a pointer to an array of child nodes (null if none). The packet lookup process starts from the root and proceeds as follows. At each trie node, a specific number of consecutive bits (referred to as the "stride" of the node) from the destination IP address are used as an index to select which of the child nodes to traverse next. When a leaf node is reached, the last prefix seen along the path to the leaf is (by construction of the trie) the longest matching prefix for the packet.

Figures 1, 2:
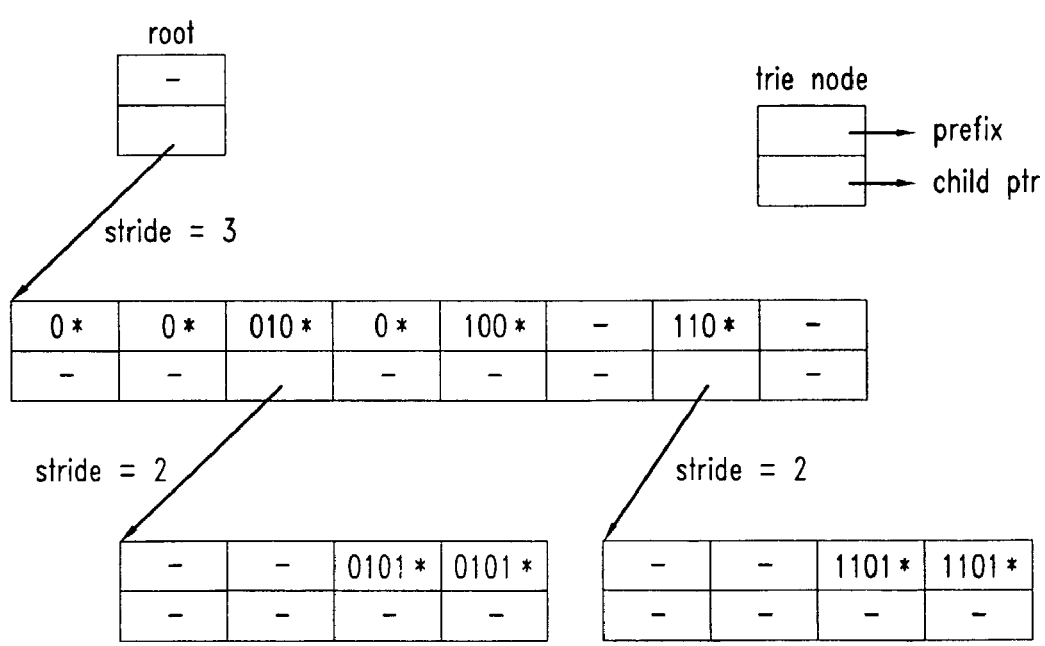
FIG. 1 shows an illustrative routing table from which it may be desired to construct a routing trie.
FIG. 2 shows an illustrative routing trie representative of the illustrative routing table shown in FIG. 1.

FIG. 1 shows an illustrative routing table from which it may be desired to construct a routing trie. FIG. 2 shows an illustrative routing trie representative of the illustrative routing table shown in FIG. 1. Each node in the illustrative trie of FIG. 2 has two fields—a prefix and a pointer to an array of child nodes. A dash (—) in the figure represents a null pointer. Note that in general, the stride at each trie node can be selected independently. A trie that uses the same stride for all the nodes in one level is referred to as a "fixed-stride" trie; otherwise, it is referred to as a "variable-stride" trie. The illustrative trie shown in FIG. 2 is a fixed-stride trie. In accordance with the illustrative embodiments of the present invention described in detail herein, fixed-stride tries are assumed. However, in accordance with other illustrative embodiments of the present invention, variable-stride trees may be generated instead.

An optimization referred to as "leaf-pushing," familiar to those skilled in the art, can be advantageously employed to reduce a trie's memory requirement by half. Specifically, prefixes at non-leaf nodes are "pushed down" to all of the leaf nodes thereunder that do not already contain a more specific prefix. In this manner, each node advantageously contains only one field—either a prefix or a pointer to an array of child nodes, but not both. Thus each trie node can now fit into one word instead of two.

Figure 3:
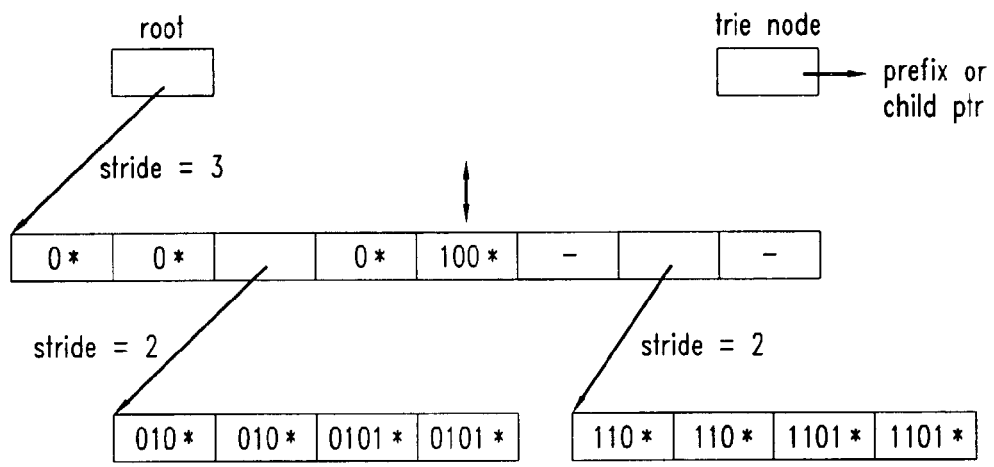
FIG. 3 shows the result of performing leaf-pushing on the illustrative routing trie shown in FIG. 2.

FIG. 3 shows the result of performing leaf-pushing on the illustrative routing trie shown in FIG. 2. In a leaf-pushed trie, such as the illustrative trie shown in FIG. 3, the longest matching prefix is always advantageously found in the leaf at the end of the traversed path. Nodes that contain a prefix pointer (that is, leaf nodes) may, for example, have a special bit set to indicate this fact, and may advantageously include a pointer to a separate table containing the corresponding next-hop information. Note, however, that updating a leaf-pushed trie is more expensive than updating a non-leaf-pushed trie, since a prefix may need to be added to (or deleted from) several leaf nodes where it needs to be (or has been) pushed down.

In accordance with the illustrative embodiments of the present invention described in detail herein, leaf-pushed tries are assumed. Moreover, in accordance with these illustrative embodiments, it is assumed that the next-hop information is stored in a separate table as described above. However, in accordance with other illustrative embodiments of the present invention, non-leaf-pushed trees may be generated as well, and other arrangements for storing the next-hop information (such as, for example, storing the next-hop information in the trie itself) may be used.

Pipelined Lookups Using Tries

Figure 4:
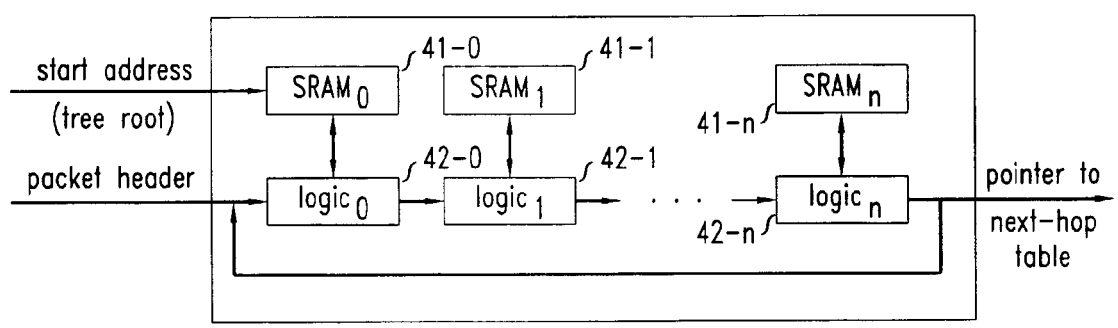
FIG. 4 shows an illustrative pipelined forwarding engine, having n+1 stages, which may be employed in accordance with an illustrative embodiment of the present invention.

Tries are a natural candidate for pipelined lookups. FIG. 4 shows an illustrative pipelined forwarding engine, having n+1 stages, which may be employed in accordance with an illustrative embodiment of the present invention. In such a pipelined hardware architecture, each stage of the pipeline advantageously consists of its own fast memory such as, for example, SRAMs (shown in FIG. 4 as SRAMs 410 through 41-n) and some hardware circuitry (shown in FIG. 4 as logic circuits 42-0 through 42-n) to extract and shift the appropriate bits from a packet's destination address. These bits are then concatenated with the lookup result from the previous stage to form an index into the memory for the current stage. Thus, a different packet can be processed independently (and therefore simultaneously) in each stage of the pipeline. It can easily be seen that if each packet traverses the pipeline once, a forwarding result for one packet can be advantageously output each and every cycle. This can be advantageously achieved by storing each level of the trie in a different pipeline stage. In various illustrative embodiments of the present invention, pipelined architectures may include 4, 6, 8, or any other number of pipeline stages.

Note that during the forwarding operation, a packet may advantageously traverse the pipeline multiple times before the forwarding result is determined. The SRAMs in the pipeline typically have a latency of two or three cycles, although the searches (reads) can be pipelined. Note that by using leaf-pushing, the trie memory as well as the bandwidth required between the SRAM and the logic can be halved.

Since the pipeline is typically used for both forwarding and classification, its memories are advantageously shared by multiple tables (such as, for example, IPv4 and IPv6 routing tables, as well as packet filtering tables and multicast routing tables for each input interface). Therefore, evenly distributing the memory requirement of each table across the pipeline memories advantageously simplifies the task of memory allotment to the different tables. It also advantageously reduces the likelihood of any one memory stage overflowing due to route/filter additions.

An Illustrative Forwarding Engine

Updates to the forwarding table advantageously go through the same pipeline as the searches. Note that a single route update can cause several write messages to be sent through the pipeline. For example, the insertion of the route "1001*" to the illustrative trie shown in FIG. 3 will cause one write in the level 2 node (linking the new node to the trie), and four writes in the level 3 node (two writes for "1001*" and two writes for pushing down "100*").

These software-controlled write messages may be advantageously packed into special write packets and sent down the pipeline, similar to the reads performed during a lookup. Each such write packet is referred to herein as a "bubble" (see description below). In particular, each bubble consists of a sequence of triples—each triple specifying a stage, a memory location, and a value—advantageously with at most one triple included for each stage. The pipeline logic at each stage advantageously issues the appropriate write command to its associated memory. As pointed out above, the more distributed the required write messages are amongst the various stages of the pipeline, the less disruption to the lookup process, since the write messages may be packaged into fewer such bubbles.

An illustrative line card on a core router in accordance with various illustrative embodiments of the present invention advantageously includes a forwarding engine that may, for example, be controlled by a local processor which may also be located on the line card. The local processor advantageously receives route updates from a central processor that processes BGP (Border Gateway Protocol) route update messages from neighboring routers, in a manner fully familiar to those of ordinary skill in the art. Using a software shadow of the pipelined routing trie, the local processor then advantageously computes the changes to be made to each stage of the forwarding pipeline for each route update. It may also advantageously perform all of the memory management for the pipeline memories.

Figure 5:
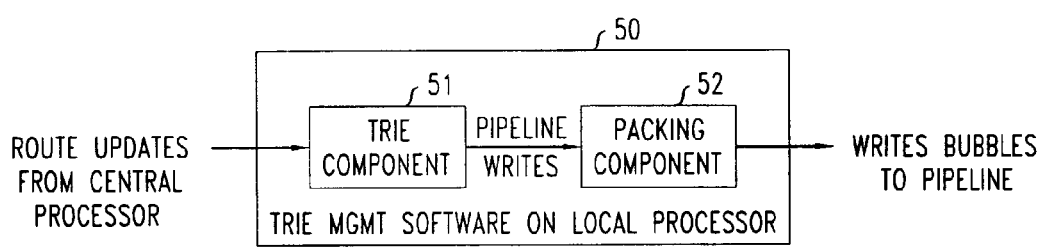
FIG. 5 shows an illustrative software system on a local processor for maintaining a routing trie in a pipelined forwarding engine in accordance with an illustrative embodiment of the present invention.

FIG. 5 shows an illustrative software system 50, resident on a local processor, for maintaining a routing trie in a pipelined forwarding engine in accordance with an illustrative embodiment of the present invention. The illustrative system comprises trie component 51 and packing component 52. Trie component 51 constructs and updates the routing trie—it advantageously processes one route update at a time and generates the corresponding writes to the pipeline memories. Packing component 52 combines writes from different updates into write bubbles that are advantageously sent down the pipeline. In particular, the packing component assumes that pipeline writes from route updates with the same timestamp can be advantageously combined together into write bubbles. However, to limit the delay in updating the pipelined trie when a large number of updates arrive with the same timestamp, the packing component advantageously combines writes from batches of at most 100 such route updates.

When a new subtree is to be added to the trie (due to a route add), the pipeline write that adds the route of the subtree is tagged by the trie component. The packing component then advantageously ensures that this write is not packed into a write bubble before any of the writes to the new subtree (to prevent any dangling pointers in the pipelined trie).

Eliminating Excess Writes in Accordance with an Illustrative Embodiment of the Invention Since, as pointed out above, neighboring routes are often added in the same time step, the same trie node can be overwritten multiple times before all the nodes are added. Thus, in accordance with an illustrative embodiment of the present invention, these extra writes may be advantageously removed by eliminating all but the last write to the same trie node. Advantageously, care is taken so as not to create any dangling pointers between consecutive write bubbles.

In particular, we define one or more writes as being "redundant" with respect to another write if the timestamp associated with the other write (i.e., the time that the other write is to be applied) is the same as or later than (by an amount less than a given threshold) the timestamp associated with each of the one or more writes (i.e., the time that each of the one or more writes is to be applied), and if the state of the routing trie after the other write has been applied is the same whether or not any of the one or more writes have also been applied. Thus, redundant writes are excess writes, and may, therefore, in accordance with an illustrative embodiment of the present invention, be advantageously eliminated.

Figure 6:
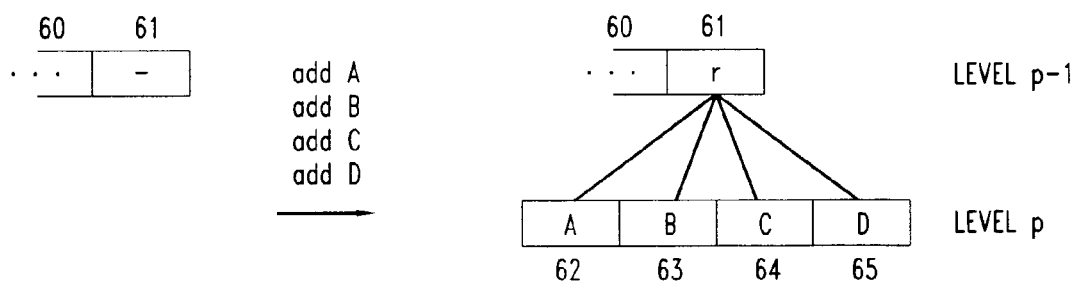
FIG. 6 shows a portion of an illustrative routing trie before and after four neighboring prefixes are illustratively added.

FIG. 6 shows a portion of an illustrative routing trie before and after four neighboring prefixes are illustratively added. Specifically, the figure shows four neighboring 24-bit routes—A, B, C, and D—all of which are assumed herein to be added in the same timestamp. The first route which is added (for example, A) may cause all four new nodes—i.e., nodes 62, 63, 64 and 65—to be created. A pointer to that route (e.g., A) would then be written in node 62 and a null pointer would be written to each of its three neighboring nodes—nodes 63, 64 and 65. When B, C, and D are added, pointers to them will then be written in these neighboring nodes—namely, into nodes 63, 64 and 65, respectively.

Figures 7, 8:
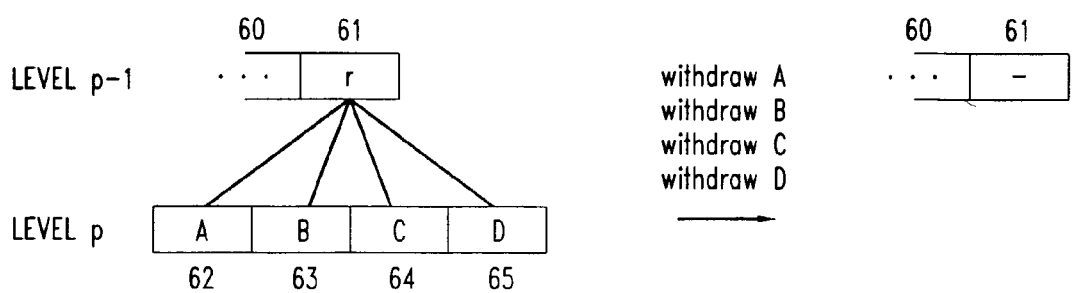
FIG. 7 shows the elimination of excess writes as applied to the illustrative prefix addition of FIG. 6 in accordance with an illustrative embodiment of the present invention.
FIG. 8 shows a portion of an illustrative routing trie before and after four neighboring prefixes are illustratively withdrawn.

FIG. 7 shows the elimination of excess writes as applied to the illustrative prefix addition of FIG. 6 in accordance with an illustrative embodiment of the present invention. The node numbers represent the memory locations (indices) in the pipeline stage, and the value 0 represents the null pointer. As pointed out above, the timestamps associated with each write are not shown in the figure, but it is to be assumed that the timestamps associated with all of the writes shown are the same. Alternatively, the timestamps may be within close proximity of each other—namely, having a difference less than a given threshold, such as, for example, less than one second.

Specifically, as shown in the figure, the first of the two above-described writes to each neighboring node (e.g., B, C, and D) is eliminated, thereby resulting in the elimination of three excess writes. Note that the ordering of the writes is advantageously performed such that the trie is never left in an inconsistent state (i.e., a state with pointers pointing to uninitialized nodes). In particular, the write that adds the root of the new subtree is advantageously tagged as shown in FIG. 7 (labeled with a "*") by the trie component, and all trie nodes under it are advantageously written before the tagged write is sent to the pipeline.

In accordance with an illustrative embodiment of the present invention, excess writes can also be advantageously eliminated when neighboring routes are withdrawn. Note specifically that it is often the case that an entire subtree is deleted when neighboring routes are withdrawn. Specifically, FIG. 8 shows a portion of an illustrative routing trie before and after four neighboring prefixes (and thereby the associated subtree) are illustratively withdrawn. In particular, nodes 62, 63, 64 and 65 are removed—corresponding to the withdrawal of routes A, B, C, and D, respectively—and the contents of node 61 thereby becomes a null pointer.

Figures 9, 10:
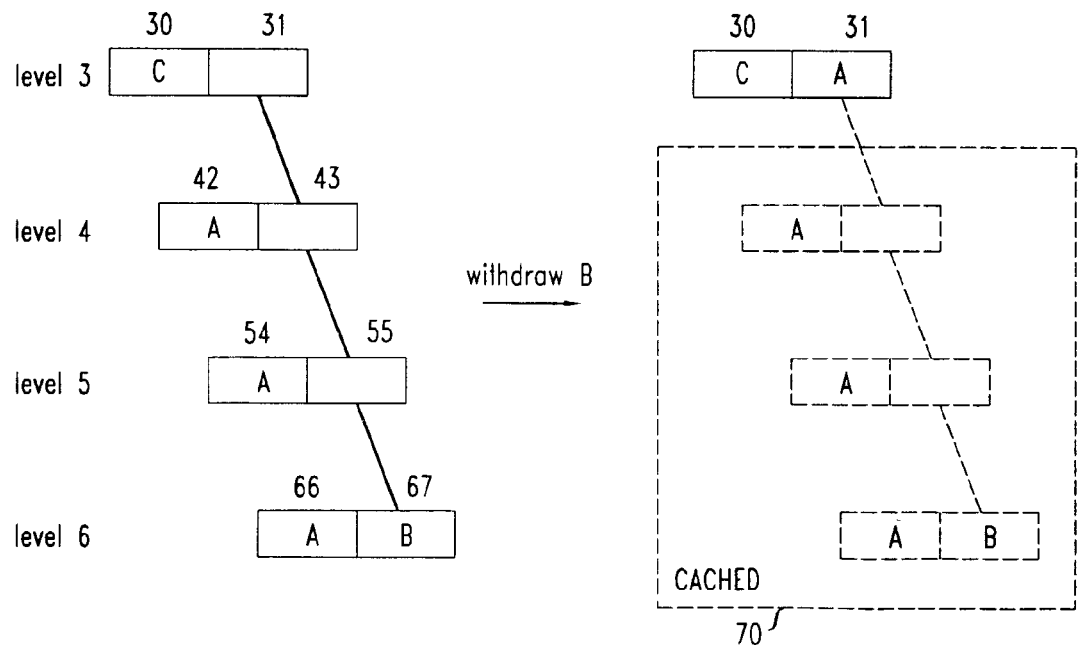
FIG. 9 shows the elimination of excess writes as applied to the illustrative prefix withdrawal of FIG. 8 in accordance with an illustrative embodiment of the present invention.
FIG. 10 shows a caching operation applied to a deleted portion of an illustrative routing trie in accordance with an illustrative embodiment of the present invention.

FIG. 9 shows the elimination of excess writes as applied to the illustrative prefix withdrawal of FIG. 8 in accordance with an illustrative embodiment of the present invention. In particular, trie component 51 as shown in FIG. 5 advantageously tags any pipeline write that deletes the root of an entire subtree. Then, in accordance with the illustrative embodiment of the present invention, the packing component eliminates all of the writes in that subtree that occur with the same timestamp before the tagged write. For example, as shown in FIG. 9, the write to withdraw D is advantageously tagged as shown (labeled with a "*") by the trie component, thereby enabling the elimination of the first three writes—namely, the write to withdraw A, the write to withdraw B, and the write to withdraw C.

Caching Deleted Subtrees in Accordance with an Illustrative Embodiment of the Invention As pointed out above, a best route to a destination prefix is often withdrawn, and then a new route having the same destination prefix, but typically with a different next hop, is then added back a few seconds later. Since the withdrawal and addition typically do not appear with the same timestamp, one cannot simply update the next hop table (if appropriate) in such a case. Thus, the associated subtree would be deleted, only to be added back soon thereafter.

However, in accordance with an illustrative embodiment of the present invention, when a route withdrawal causes a subtree to be deleted, the trie component advantageously caches the subtree in software and remembers the location of the cached trie in the pipeline memory. The deleted subtree advantageously contains pointers to the withdrawn route, as well as (possibly) pointers to a shorter route that was pushed down into the subtree due to leaf pushing. (Note that at most one prefix can be pushed down into any subtree from above the subtree.) Therefore, the (one) prefix that was pushed down (if any), along with the last route in the subtree that was withdrawn, are advantageously stored with the cached subtree.

Then, in accordance with the illustrative embodiment of the present invention, if the same route is added before any other neighboring route gets added, and if, in addition, the prefix that was pushed down remains unchanged, we simply add back a pointer to the deleted subtree in the pipeline memory. Note that all of this checking may be advantageously performed in software by the trie component, and thus, the pipeline advantageously sees only one write instead of a number of writes. Conceptually, note that the caching optimization of the illustrative embodiment of the present invention is essentially equivalent to allowing a fast "undoing" of one route withdrawal.

FIG. 10 shows a caching operation applied to a deleted portion of an illustrative routing trie in accordance with an illustrative embodiment of the present invention. Specifically, the figure shows the illustrative caching operation employed in response to a deletion of route B. A denotes the route that has been pushed down the subtree containing B, and the numbers denote memory locations (indices). As shown in the figure, the withdrawal of B advantageously results in the removal from the routing trie and the caching of subtree 70.

FIG. 11 shows the elimination of writes which advantageously results from the illustrative caching operation as applied in FIG. 10 when a deleted route is re-inserted. N4, N5, and N6 denote pointers to the nodes at levels 4, 5, and 6, respectively, and again, the numbers denote memory locations (indices). As described above, the write that adds the root of the new subtree is advantageously tagged as shown in FIG. 11 (labeled with a "*") by the trie component. As can be seen from the figure, the re-insertion of B can be advantageously accomplished in accordance with the illustrative embodiment of the present invention with use of a single write operation, as a result of having advantageously cached deleted subtree 70.

Note that when multiple routes withdrawn in the same time step result in the deletion of a subtree, the caching optimization in accordance with an illustrative embodiment of the present invention can be in "conflict" with the optimization of eliminating excess writes, also in accordance with an illustrative embodiment of the present invention. For example, consider the illustrative subtree shown in FIG. 8, after routes A, B, and C have been withdrawn. If route D is then withdrawn and if the deleted subtree is then cached, the cached subtree would still contain routes A, B, and C—note that pipeline writes that deleted these routes were eliminated by the packing component as an optimization. If route D is now added back, however, and if the cached subtree is reinserted into the trie, routes A, B, and C might thereby also (incorrectly) be added back to the trie. To avoid such an error, in accordance with the illustrative embodiment of the present invention, the trie component advantageously caches a subtree only if a single route is deleted from it in one timestamp. By storing timestamps in the shadow trie nodes when they are modified, the trie component advantageously checks for this condition before caching a subtree.

Note that not all withdrawn routes are added back soon after their deletion. Therefore, caching subtrees can consume precious pipeline memory. However, since a route withdraw is often closely followed by an add, most of the benefit of caching subtrees can be advantageously obtained by incurring relatively small memory overheads. Therefore, in accordance with the illustrative embodiment of the present invention, the amount of caching memory is advantageously limited to a fixed size. In particular, it has been observed that nodes withdrawn several timestamps in the past are less likely to be added back. Thus, in accordance with the illustrative embodiment of the present invention, a FIFO (First-In-First-Out) list of cached nodes is advantageously maintained—when the caching memory in use exceeds the fixed size limit, the oldest cached nodes are advantageously deleted. Noting that as much as 80% of the optimization benefits may be obtained when the cached memory is restricted to only 5% of the memory allocated to the routing trie, a 5% caching memory overhead threshold is advantageously used in accordance with the illustrative embodiment of the present invention.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. For example, although the illustrative embodiments of the present invention specifically as described herein apply to incremental routing trie updates for a forwarding engine using a pipelined ASIC architecture, it will be obvious to those skilled in the art that the instant invention, as claimed, may also be applied to reduce the number of write operations during route updates in forwarding engines using other, alternative architectures.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for updating a routing trie stored in a routing engine, the routing engine comprised in a router for routing packets in a communications network, the method implemented in the routing engine and comprising the steps of:

generating a plurality of writes, each of said writes specifying a location in the routing trie to be modified and a new value to be written into said location in the routing tile when said write is applied, each of said writes having a timestamp associated therewith, said timestamp representative of a time when said write is generated;

identifying one or more excess writes and another write, wherein said excess writes are writes which specify a location in said routing trie to be modified but are redundant with respect to the other identified write, said one or more excess writes having associated timestamps representative of times which are not later than the time represented by the timestamp associated with the other identified write, and wherein each difference between the times represented by the timestamp associated with each one of said excess writes and the timestamp associated with said other identified write is less than a given threshold, and wherein applying said other identified write without having applied any of said excess writes results in a routing trie state which is equivalent to a routing trie state which would result from applying any one or more of said excess writes and said other identified write; and updating the routing trie by applying the other identified write and not applying any of the excess writes.

2. The method of claim 1 wherein said plurality of writes is representative of an addition of one or more routes to the routing trie, and wherein each of said one or more excess writes and said other identified write each specifies a common location in the routing trie.

3. The method of claim 2 wherein said plurality of writes comprises one or more writes representative of an addition of a subtree to the routing trie, wherein one of said one or more writes representative of said addition of said subtree to the routing trie is representative of a connection of said subtree to the routing trie, wherein the step of generating said plurality of writes includes tagging said write representative of said connection of said subtree to the routing trie, and wherein the step of updating the routing trie further comprises applying said write representative of said connection of said subtree to the routing tile after said other identified write has been applied based on said write representative of said connection of said subtree to the routing trie having been tagged.

4. The method of claim 1 wherein said plurality of writes is representative of a withdrawal of one or more routes from the routing trie, wherein said other identified write is representative of a disconnection of a subtree from the routing trie, and wherein each of said one or more excess writes specifies a location in the routing trie within said subtree.

5. The method of claim 4 wherein the step of generating said plurality of writes includes tagging said write representative of said disconnection of said subtree from the routing trie, and wherein the step of updating the routing trie comprises applying said write representative of said disconnection of said subtree from the routing trie based on said write representative of said disconnection of said subtree from the routing trie having been tagged.

6. The method of claim 4 wherein applying the other identified write disconnects said subtree from the routing trie, and wherein the step of updating further comprises saving the disconnected subtree in a cache.

7. The method of claim 6 further comprising the steps of:
generating an additional one or more writes representative of an addition of one or more of said routes whose withdrawal was represented by said plurality of writes, said additional one or more writes having associated timestamps representative of times which are later than the time represented by the timestamp associated with the other identified write;
identifying one of said additional one or more writes as being representative of a re-connection of said subtree to the routing trie; and
further updating the routing trie by applying the identified one of said additional one or more writes to thereby restore the disconnected subtree.

8. The method of claim 6 wherein the cache comprises a software cache memory.

9. The method of claim 1 wherein said routing engine has a pipeline architecture and wherein said routing trie is distributed among a plurality of pipeline stages within said pipelined architecture.

10. The method of claim 1 further comprising the step of packing said other identified write together with one or more other writes into a write bubble.

11. A router for routing packets in a communications network, the router comprising a routing engine, the routing engine comprising means for updating a routing trie stored in the routing engine, the means for updating the routing trie comprising:
means for generating a plurality of writes, each of said writes specifying a location in the routing trie to be modified and a new value to be written into said location in the routing trie when said write is applied, each of said writes having a timestamp associated therewith, said timestamp representative of a time when said write is generated;
means for identifying one or more excess writes and another write, wherein said excess writes are writes which specify a location in said routing trie to be modified but are redundant with respect to the other identified write, said one or more excess writes having associated timestamps representative of times which are not later than the time represented by the timestamp associated with the other identified write, and wherein each difference between the times represented by the timestamp associated with each one of said excess writes and the timestamp associated with said other identified write is less than a given threshold, and wherein applying said other identified write without having applied any of said excess writes results in a routing trie state which is equivalent to a routing trie state which would result from applying any one or more of said excess writes and said other identified write; and
means for updating the routing trie by applying the other identified write and not applying any of the excess writes.

12. The router of claim 11 wherein said plurality of writes is representative of an addition of one or more routes to the routing trie, and wherein each of said one or more excess writes and said other identified write each specifies a common location in the routing trie.

13. The router of claim 12 wherein said plurality of writes comprises one or more writes representative of an addition of a subtree to the routing trie, wherein one of said one or more writes representative of said addition of said subtree to the routing trie is representative of a connection of said subtree to the routing trie, wherein the means for generating said plurality of writes includes means for tagging said write representative of said connection of said subtree to the routing trie, and wherein the means for updating the routing trie further comprises means for applying said write representative of said connection of said subtree to the routing trie after said other identified write has been applied based on said write representative of said connection of said subtree to the routing trie having been tagged.

14. The router of claim 11 wherein said plurality of writes is representative of a withdrawal of one or more routes from the routing trie, wherein said other identified write is representative of a disconnection of a subtree from the routing trie, and wherein each of said one or more excess writes specifies a location in the routing trie within said subtree.

15. The router of claim 14 wherein the means for generating said plurality of writes includes means for tagging said write representative of said disconnection of said subtree from the routing trie, and wherein the means for updating the routing trie comprises means for applying said write representative of said disconnection of said subtree from the routing trie based on said write representative of said disconnection of said subtree from the routing trie having been tagged.

16. The router of claim 14 wherein applying the other identified write disconnects said subtree from the routing trie, and wherein the means for updating further comprises means for saving the disconnected subtree in a cache.

17. The router of claim 16 wherein the means for updating the routing trie further comprises:
means for generating an additional one or more writes representative of an addition of one or more of said routes whose withdrawal was represented by said plurality of writes, said additional one or more writes having associated timestamps representative of times which are later than the time represented by the timestamp associated with the other identified write;
means for identifying one of said additional one or more writes as being representative of a re-connection of said subtree to the routing trie; and
further means for updating the routing trie by applying the identified one of said additional one or more writes to thereby restore the disconnected subtree.

18. The router of claim 16 wherein the cache comprises a software cache memory.

19. The router of claim 11 wherein said routing engine has a pipelined architecture and wherein said routing trie is distributed among a plurality of pipeline stages within said pipelined architecture.

20. The router of claim 11 wherein the means for updating the routing trie further comprises means for packing said other identified write together with one or more other writes into a write bubble.

* * * * *